May 23, 1939.  M. F. ZIFFERER  2,159,580
EXPANSION BOLT
Filed Aug. 30, 1937
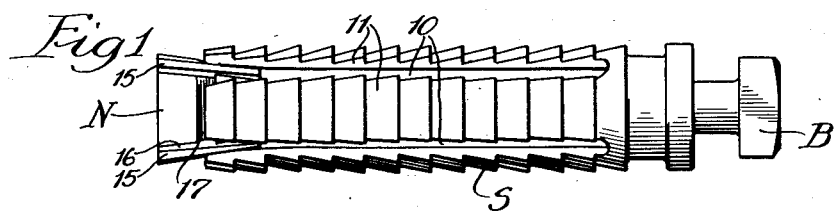
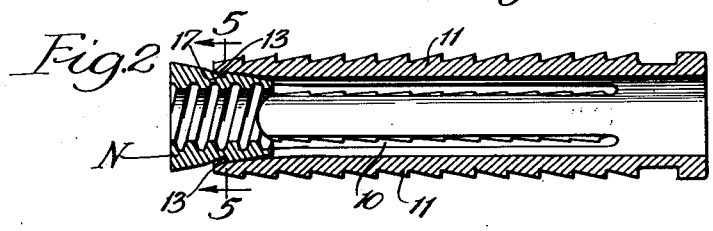
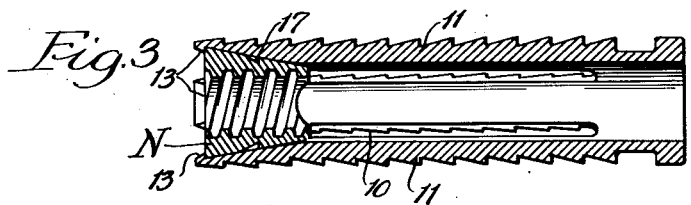
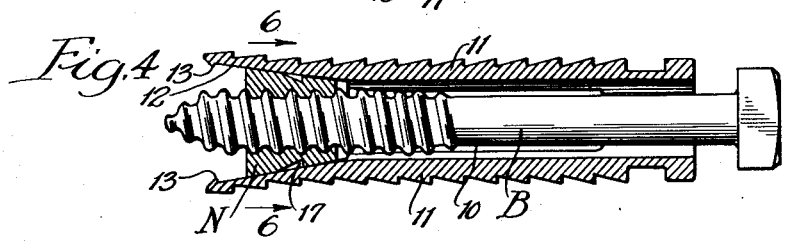
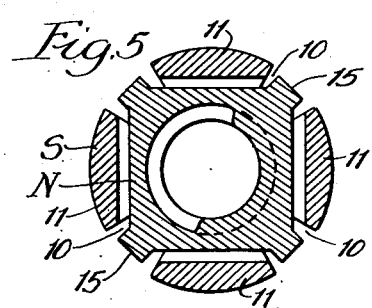
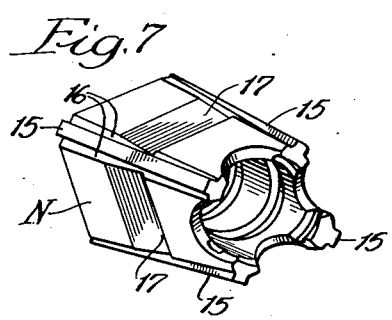
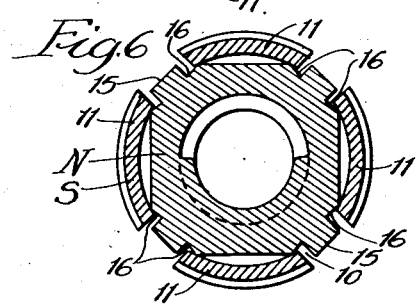
Inventor:
Morton F. Zifferer,
By [signature]
Attorneys.

Patented May 23, 1939

2,159,580

UNITED STATES PATENT OFFICE 2,159,580

EXPANSION BOLT

Morton F. Zifferer, Great Neck, N. Y., assignor, by mesne assignments, to U. S. Expansion Bolt Co., York, Pa., a corporation of Pennsylvania Application August 30, 1937, Serial No. 161,600

3 Claims. (Cl. 85—2.4)

This invention relates to improvements in expansion bolts of the type comprising an expansible shield and a tapered nut or expander. One of the objects is to provide a locking means whereby the proper assembly of the shield and nut is assured, and whereby an initial expansion is readily obtainable. Another and equally important object is to provide means whereby the expansive strains are withstood by the nut and shield in an improved manner.

These and other objects of the invention will be described in the following specification wherein reference is made to the accompanying drawing which illustrates an embodiment thereof in the manner following:

Figure 1 is an elevation view of the expansion device complete with bolt, showing the nut partially inserted within the shield at the inner end;

Fig. 2 is a central longitudinal section thereof;

Fig. 3 which is a longitudinal section shows the nut advanced completely within the shield to produce an initial expansion thereof;

Fig. 4 is a longitudinal section showing the nut further advanced to cause an increased expansion of the shield, a lag bolt being indicated in co-operation therewith;

Fig. 5 is an enlarged cross-section through the device taken on line 5—5 of Fig. 2 looking in the direction of the arrows;

Fig. 6 is a similar view taken on line 6—6 of Fig. 4; and

Fig. 7 is a perspective view of the nut per se.

The device herein shown comprises a one-piece shield S and an expanding nut N adapted to be operated by a bolt B. The shield is formed with a plurality of slots 10 each extending longitudinally from its inner end for a major portion of its length to provide a like number of sections 11 each outwardly yieldable to engage with the walls of a surrounding aperture. Extending axially through the shield is a passageway which is transversely arcuate throughout its several sections. The inner face of each section is outwardly tapered as at 12 in the region of its inner end. At the inner end of the shield is an inwardly protruding hook 13 in the form of a lug or wall, one or more of them, adapted to engage the nut in a manner which will now be explained.

The nut is formed with a plurality of sides corresponding in number and generally in taper to the sections of the shield. Extending longitudinally along each corner of the nut is a rib 15 adapted to slide within one of the longitudinal slots of the shield, and formed adjacent the base of each rib on opposite sides thereof is a groove 16. A beveled recess 17 which extends transversely across each side of the nut provides in effect a ratchet shoulder between each two ribs thereof which is adapted to receive engagement from the shield hook to hold the nut in a position of partial or complete insertion within the shield, as shown, respectively in Figs. 2 and 3. In advancing from one position to the other each hook rides up and along the engaged side of the nut so that in the position of complete insertion expansion of the shield sections has already started. The nut is retained in assembled relation with the shield in either of these two positions. The nut can thus be locked within the shield with capacity to move only inwardly. By advancing the nut the shield will be initially expanded to insure a tight anchorage, thus overcoming any tendency of rotation on the part of the shield during the early stages of the expanding operation.

The nut transmits expanding forces to the shield at eight different points, two points adjacent each corner close to one of its ribs. This is important because the nut is of its maximum thickness at these points where it is possessed of adequate strength to resist crushing. The nut is prevented from turning by the ribs 15 which protrude into the shield slots 10. The bore within the nut may be provided with threads for co-operation with any standard form of bolt, a lag bolt being illustrated by way of example.

I claim:

1. In an expansion bolt the combination of a one-piece shield having a plurality of slots extending longitudinally from its inner end for a major portion of its length to provide a like number of sections each outwardly yieldable to engage with the walls of a surrounding aperture, the shield being formed with an axial passageway which is transversely arcuate throughout its several sections each of which is outwardly tapered in the region of its inner end, a nut having a plurality of sides corresponding in number and generally in taper to the sections of the shield, a rib extending longitudinally along each corner of the nut adapted to slide within one of the longitudinal slots of the shield, there being a pair of grooves adjacent the base of each rib and a recess extending transversely of one side of the nut and beveled inwardly toward its outer end to provide in effect a ratchet shoulder between two ribs thereof, and a hook extending inwardly from the inner end of the shield adapted to engage the nut either at the inner end or the shoulder thereof whereby to retain the nut in assembled relation within the shield in either of two positions, the nut being free to advance from its outer to an inner position but not vice versa.

2. In an expansion bolt the combination of a one-piece shield having a plurality of slots extending longitudinally from its inner end for a major portion of its length to provide a like number of sections each outwardly yieldable to engage with the walls of a surrounding aperture, the shield being formed with an axial passageway which is transversely arcuate throughout its several sections each of which is outwardly tapered in the region of its inner end, a nut having a plurality of sides corresponding in number and generally in taper to the sections of the shield, there being a recess extending transversely of each side of the nut and beveled inwardly toward its outer end to provide in effect a ratchet shoulder, and a hook extending inwardly from the inner end of the shield adapted to engage the nut either at the inner end or the shoulder thereof whereby to retain the nut in assembled relation within the shield in either of two positions, the nut being free to advance from its outer to an inner position but not vice versa.

3. In an expansion bolt the combination of a one-piece shield having a continuous circular head, a plurality of slots proceeding longitudinally from its inner end through a major portion of the shield length to provide a like number of spring sections each outwardly yieldable under tension to engage with the walls of a surrounding aperture, the shield being formed with an axial passageway of substantially uniform cross sectional area from the head end to a point relatively close to the inner end of the shield, the passageway being transversely arcuate through its several sections and each of said sections being outwardly tapered in the region of its inner end, a polygonal nut having a plurality of sides corresponding in number and generally in taper to the sections of the shield and a rib extending longitudinally along each corner of the nut adapted to slide within one of the longitudinal slots of the shield, there being a pair of grooves adjacent the base of each rib adapted to receive engagement from the proximate corner of the shield section whereby to confine the transmission of expansive forces radially through such points, and the nut fitting snugly within the inner end of the shield prior to expansion thereof in a manner whereby to exert an outward thrust upon each of the shield sections proceeding from points adjacent the base of each rib on the nut to the proximate corner of the adjacent shield section.

MORTON F. ZIFFERER.